Oct. 4, 1949.  E. A. STALKER  2,483,480
SPANWISE VARIABLE LIFT CONTROL FOR ROTARY WINGS
Filed Sept. 14, 1944  4 Sheets-Sheet 1

INVENTOR.
Edward A. Stalker

Oct. 4, 1949.  E. A. STALKER  2,483,480
SPANWISE VARIABLE LIFT CONTROL FOR ROTARY WINGS
Filed Sept. 14, 1944  4 Sheets-Sheet 2
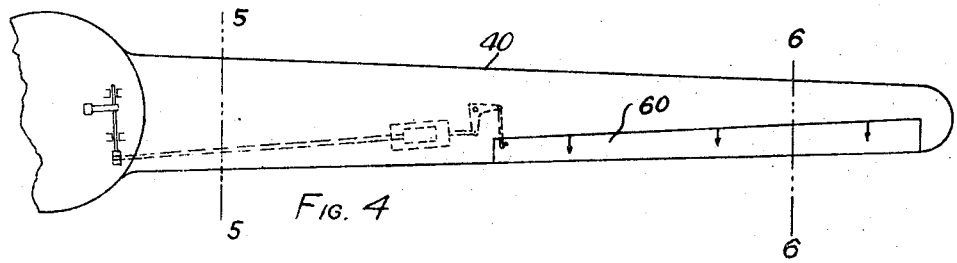
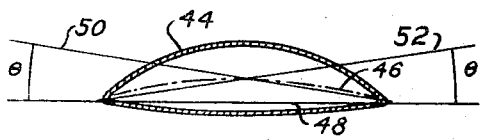
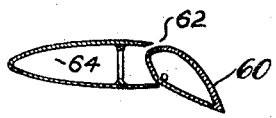
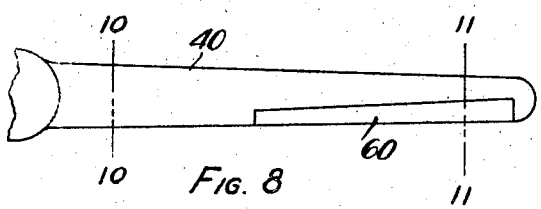
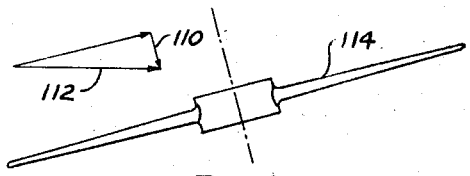
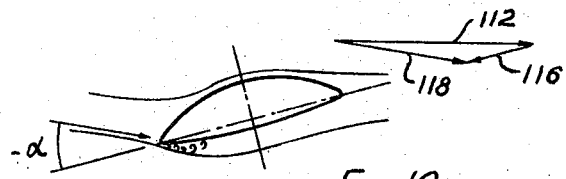
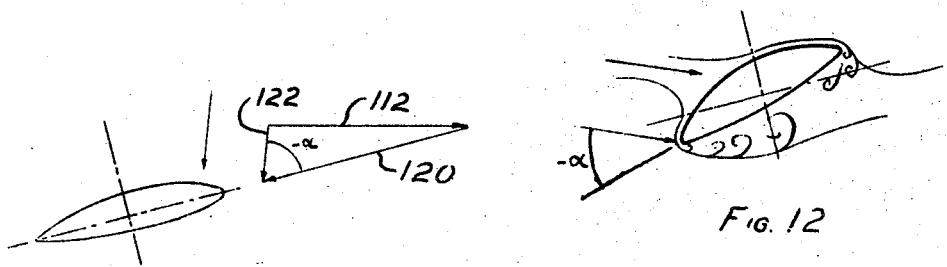
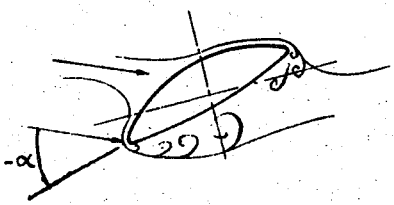
INVENTOR.
Edward A Stalker Oct. 4, 1949.   E. A. STALKER   2,483,480
SPANWISE VARIABLE LIFT CONTROL FOR ROTARY WINGS
Filed Sept. 14, 1944   4 Sheets-Sheet 3

INVENTOR.
Edward A. Stalker

Oct. 4, 1949. E. A. STALKER 2,483,480
SPANWISE VARIABLE LIFT CONTROL FOR ROTARY WINGS
Filed Sept. 14, 1944 4 Sheets-Sheet 4
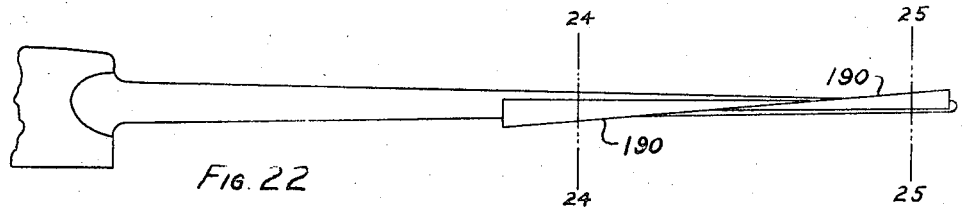
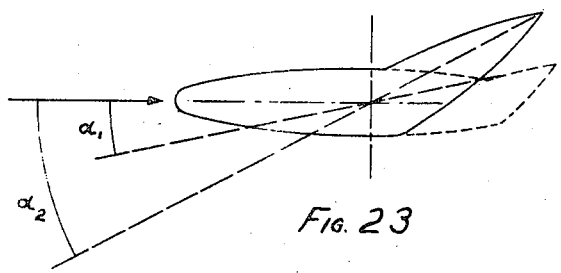
Fig. 24
Fig. 25
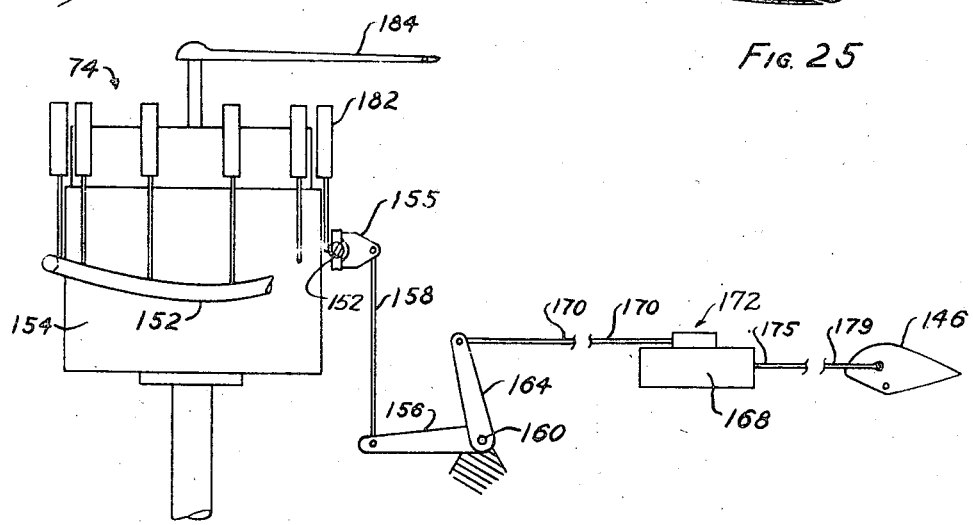
Fig. 18
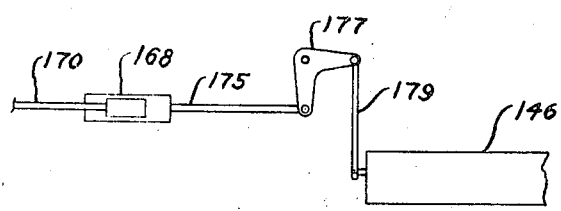
Fig. 19
INVENTOR.
Edward A. Stalker Patented Oct. 4, 1949

2,483,480

UNITED STATES PATENT OFFICE

2,483,480

SPANWISE VARIABLE LIFT CONTROL FOR ROTARY WINGS

Edward A. Stalker, Bay City, Mich.

Application September 14, 1944, Serial No. 554,054

11 Claims. (Cl. 170—135.22)

My invention relates particularly to direct lift aircraft. One object is to provide a machine capable of high forward speeds. Another object is to provide a lifting rotor capable of smooth operation at a high forward speed. Other objects will appear from the description and drawings.

A contemporary limitation on the forward speed of a helicopter is the inability to support the retreating blade at a large advance ratio, that is the ratio of forward to peripheral speed. By employing boundary layer control to give large lift coefficients over the outer portion of the retreating blade a large moment can be had to support the retreating blade to higher ratios than with a plain blade. However in contemporary practice the total lift on the helicopter cannot be kept substantially constant with time as the advance ratio approaches higher and higher values. This invention shows how a very large advance ratio can be used while the total lift is kept constant and the retreating blade is supported.

I accomplish the above objects by the means illustrated in the accompanying drawings in which—

Figure 4 is a fragmentary top plan view of a blade and a portion of the hub to show the internal mechanism;

Figure 5 is a section along the line 5—5 in Figure 4;

Figure 6 is a section along line 6—6 in Figure 4;

Figure 7 is the same section as Figure 6 with the flap lowered;

Figure 8 is a fragmentary top plan view of the blade;

Figure 9 is a side view of the tilted rotor in relation to the wind velocity vectors;

Figure 10 is a section along the line 10—10 in Figure 8 showing the relative flow vectors;

Figure 11 shows a section of the retreating blade along line 11—11 in Figure 8, in relation to the components of the relative wind;

Figure 12 is the same section as Figure 10 showing the relative flow for increased angle of pitch;

Figure 18 is another side view of the mechanism for actuating the flaps;

Figure 19 is a fragmentary top plan view of the flap actuating mechanism;

Figure 22 is a fragmentary elevation from the rear of the blade and blade flap;

Figure 23 is a diagrammatic view of an airfoil section with the flap in two positions;

Figure 24 is a section along the line 24—24 in Figure 22; and

Figure 25 is a section along the line 25—25 in Figure 22.

Figure 1:
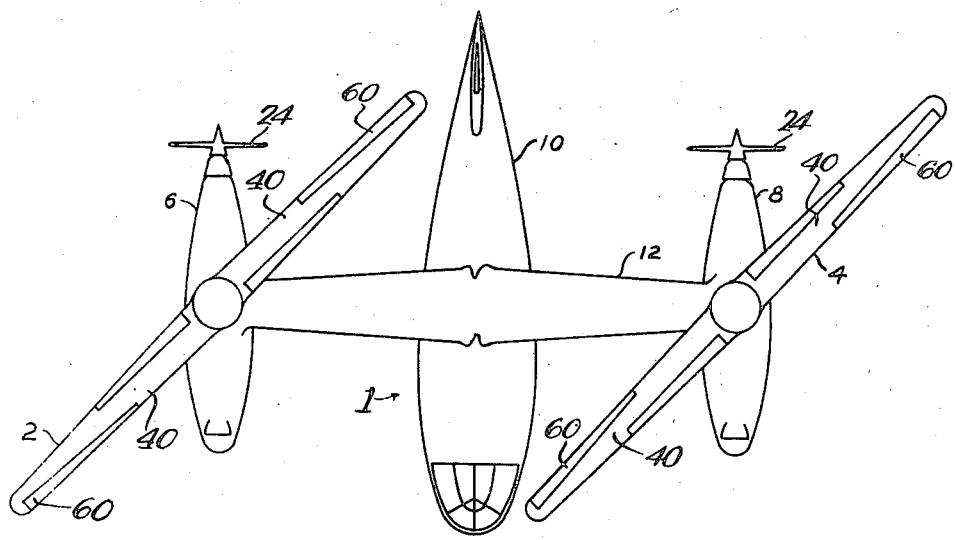
Figure 1 is a top plan view of the aircraft.
Figure 2:
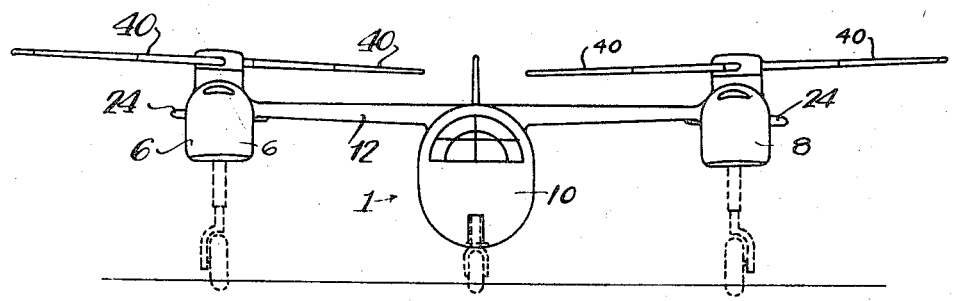
Figure 2 is a front elevation.
Figure 3:
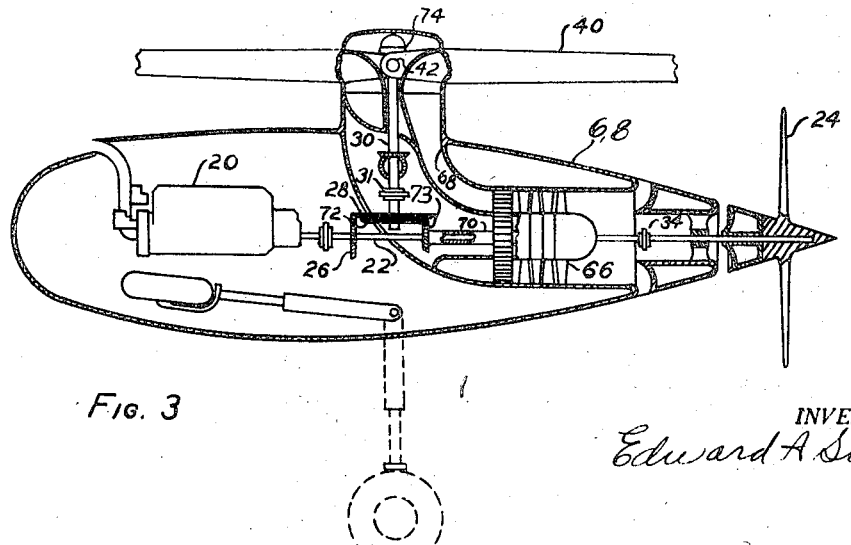
Figure 3 is a fragmentary side elevation of a rotor and nacelle.
Figure 13:
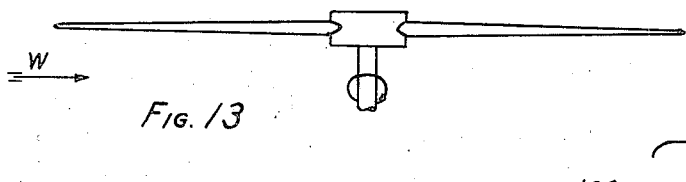
Figure 13 is a side elevation of the rotor being translated perpendicular to its axis of rotation.

Referring particularly to the drawings the aircraft is 1 employing the two sustaining rotors 2 and 4. They support the nacelles 6 and 8 and the fuselage 10 by means of the wing 12.

Each nacelle contains an engine 20 whose shaft 22 extends rearward to drive and support the vertical propellers 24. This shaft also has fixed to it the gear 26 meshing with gear 28 on the rotor shaft 30. Thus the engine drives the rotor by the direct application of torque to the rotor shaft.

The helicopter is operated with the axis of shaft 30 substantially perpendicular to the direction of flight. The forward propulsive force is to be derived from the propellers 24 which are adjustable as to pitch. Then in hovering flight the pitch can be reduced to the condition of zero thrust. Also if desired the clutch 34 can be used to disconnect the propellers from the engine.

In starting the engine it is disconnected from the rotor by means of clutch 31.

The rotors each have two blades 40 hinged to the hub 42. These may also be rigidly attached to the hub in certain designs. At the root as shown particularly in Figures 4 and 5 the blade section 44 is lenticular in shape with a mean camber line 46 having a large maximum ordinate above the subtending chord 48. The zero lift lines 50 and 52 are shown constructed through the end points of the section and the mid point of the mean camber line. They make the angles $\theta$ with the chord. If the relative wind were along the chord the angle of attack would also be $\theta$. It is apparent that the inner portion of the blade will lift for a relative wind toward either end of the section as a nose.

It is important that the inner portion of the blade be capable of lift for a reversed flow because at appreciable forward speeds the flow direction is reversed over the inner portion of the retreating blade, and at high forward speeds the inner half is subjected to such a high velocity that it contributes a very significant amount of lift.

60. Each flap is controlled so that it is depressed on the retreating sides of the orbit. The blade also has the slot 62 leading out of the interior 64 of the blade. See Figures 6 and 7. When the flap is depressed and air is forced out the slot along the surface of the flap very great lift results. This aids in properly supporting the blade at great rates of advance of the aircraft.

Air is furnished to the interior of the blades by the blower 66 rotated by the rotor (or the engine). The blower 66 has the hollow drive shaft 70 rotatable on suitable bearings about the shaft 22 and geared to shaft 30 by the gears 72 and 73. The air is conducted by the duct 68 to the hub whence it flows into the blades.

The amount of air blown through the slots represents a very small percentage of the energy expended in rotating the lifting rotors, of the order of a few per cent.

The position of the flaps is governed by the governor device 74 located in the hub so that the flap is depressed to a large angular value on the retreating blade and to a relatively smaller angle on the advancing side. This device will be described subsequently.

The reasons for operating the machine with the rotor shafts vertical will be understood from the following discussion.

If the rotor shafts were inclined forward as in Figure 9 there would be an inflow velocity component 110 perpendicular to the plane of rotation of the rotor 114. The velocity of advance is the vector 112, the translational vector. This component is very large and would result in a large negative angle of attack for the blade sections. This is shown in Figures 10 to 12. Consider the inner section at 10—10 as shown in Figure 10. The horizontal wind vector is 112 while the relative wind component due to the rotation is 116. It is small because the section is near the axis of rotation. The resultant of these two vectors is 118 making an angle $\alpha$ of about —25 degrees with the chord line of the section. This is too large a negative angle to produce positive lift on the section. Actually the flow will produce negative lift and a turbulent flow condition beneath the wing.

The situation is even more serious at the outer sections such as 11—11 shown in Figure 11. Again the horizontal wind vector due to advance is 112 but the peripheral wind velocity of the section is larger being indicated by 120. The resultant is indicated by 122 which makes the direction almost perpendicular to the chord line.

In order to obtain adequate lift from the outer portions, the blade must be rotated through a large positive pitch angle. This will improve the conditions for the outer portions of the blade but it will aggravate the conditions at the inner portions as indicated in Figure 12.

Figure 14:
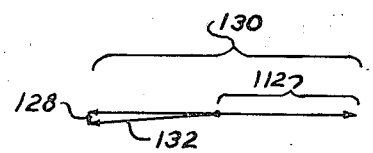
Figure 14 is an end view of the retreating blade of Figure 13 showing its relation to the velocity vectors.

If the rotor is flown with the rotor axis substantially vertical the inflow velocity is only that necessary to produce the lift. For a rotor of 40 ft. diameter carrying 5000 lbs. this will only be about 3.6 feet per second and will result in a change in angle of attack of about 1.5°. This inflow velocity vector is 128 in Figure 14. If this is combined with the resultant of the peripheral velocity vector 130 and the advance vector 112 the resultant is 132 which lies almost in the plane of rotation. The vectors in Fig. 14 apply to a chordwise section across the blade of Fig. 15 where the peripheral vector 130 is about twice the value of the advance velocity vector 112, this being a point near the tip of the blade.

Now if the flap on the outer portions of the blade is depressed there results a large positive angle of attack for the blade sections, while the inner portions remain at a suitable attitude to have a lift producing angle of attack, since for these sections also the resultant relative wind velocity vector remains substantially in the plane of rotation.

It is a feature of this invention that the blade is provided with a flap along the outer portion of the span and restricted thereto so that with a perpendicular axis of rotation the inner portions of the blade can have proper angles of attack as well as the outer portions.

It is also a feature of this invention that the blade is equipped with a slot which makes it feasible to depress the flap to very large angles with resultant increases in lift coefficient. Without the slot, burbling would ensue and the lift would be destroyed.

Figure 15:
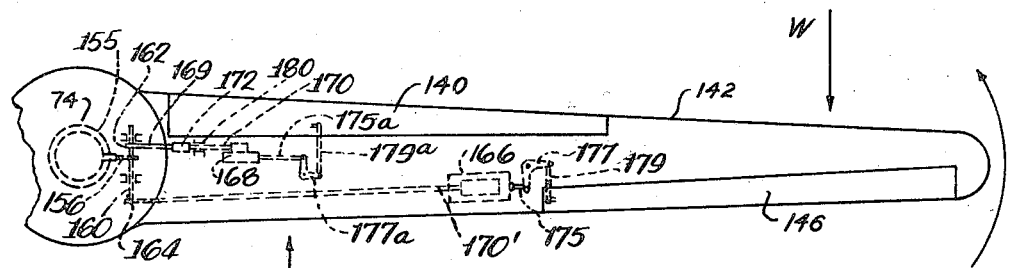
Figure 15 is a fragmentary top plan view of an alternate form of the blade.
Figure 17:
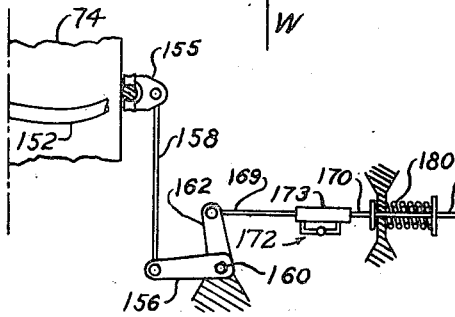
Figure 17 is a fragmentary side view of the mechanism for actuating the flaps.

Figure 15 shows a variation of the invention in which a flap 140 is placed on the inner portions of the blade 142 on the opposite side from the outer flap 146. This flap 140 is depressed on the blade in the retreating position at high forward speeds of the aircraft.

It is to be noted that the flow direction on the inner portions has been reversed as indicated by the arrow W by the forward motion. Hence the flap 140 provides a desirable means of increasing the lift of the inner portions of the blade. The motion of the flap 140 is coordinated with the motion of flap 146, both being depressed together.

They are best coordinated through the orbital position of the blade. Thus in Figure 15 each flap is controlled by the control device 74 located in the hub and the other mechanisms shown in Figures 16 to 19. The control device 74 is shown in elevation in Figure 18. It has a deformable cam 152 in the form of a coiled circular spring about the inner cylinder 154. A rider 155 follows the cam contour and actuates the bell crank 156 by means of the link 158. The bell crank is carried on the cross shaft 160 which has the crank arms 162 and 164. The former actuates a power means 168 which moves the flap 140. The latter actuates another similar power means 166 through rod 170' which moves the main flap 146 by means of rod 175, crank 177 and rod 179. The servo power means 168 is connected to the flap 140 through rod 175a, crank 177a and rod 179a.

In Figure 18 the flap 146 is shown turned 90° to its true position which is shown in Figure 19.

The power device 168 for the flap 140 is actuated by the rods 169 and 170 connected by the release 172 composed of the cylinder 173 on rod 170 and the piston 174 on rod 169. The spaces within the cylinder on opposite sides of the piston are connected by the tube 176 having the solenoid valve 178 controlled by a suitable switch (not shown) within reach of the pilot. When the valve is open the rod 169 cannot pull on rod 170 but when the valve is closed a pull can be exerted. A pull closes the flap valves 119 while a push will cause them to open. Hence only a pull from 169 can be exerted on rod 170.

A spring 180 pressing axially on a shoulder on rod 170 always insures that the flap 140 is put in the undepressed position when valve 178 is opened by the pilot. When he closes the valve 178 after a high forward speed is attained the flap 140 is depressed cyclically as the blade passes about its orbit. The flap 140, however, is arranged to be substantially in line with the main body of the blade when it is on the advancing side of its orbit.

At low forward speeds, that is, low advance ratios, the flap 140 is made inoperative by opening valve 178 so that spring 180 will maintain the flap in raised position, that is, in line with the main body of the blade. The orbital control 74 continues to oscillate rod 169 even at low ratios but because of the release 172 and the open valve 178, it does not transmit any oscillation to flap 140.

The contour of the deformable cam 152 is controlled by a group of pressure responsive elements 182 which are served with an air pressure from the throat of a venturi in the arm 184 which rotates about a vertical axis in coordination with the rate of rotation of the main blade. Since this device itself is not a feature of the present invention it will not be further described. It is described in detail in application Serial No. 553,652, filed September 11, 1944, now Patent No. 2,425,651.

It is also a feature of this invention that the rotors have only two blades. It is important in connection with keeping the total lift invariant with time. This feature will now be discussed.

Figure 20:
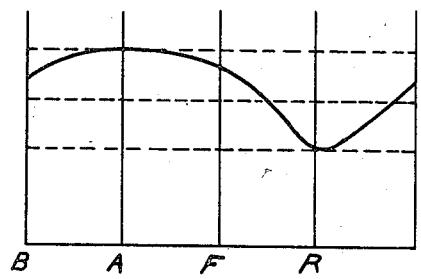
Figure 20 is a graph of the lift loading of the blades in various orbital positions.
Figure 16:
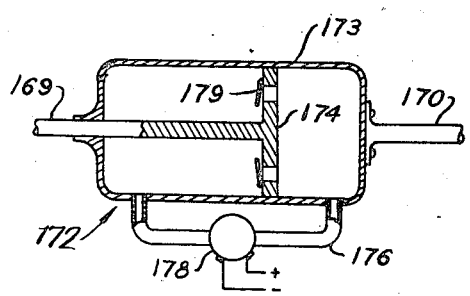
Figure 16 is a fragmentary part section of the cylinder mechanism for actuating the flaps.

Figure 20 shows the lift for the blade at various azimuthal positions about the axis of rotation. The letters B, A, F, R stand for Back, Advancing, Front and Retreating respectively. This curve is for a moderate advance ratio.

If the order of the advance ratio is about what is currently contemplated or in use, that is something less than 0.4, the sum of the lifts for three blades can be made to approach the same value for all possible positions of the blades when boundary layer control is applied to the retreating blade to increase its lift. The more blades there are the nearer can the ideal of invariant lift be attained. This has led to the belief that three or more blades are necessary to achieve a constant lift.

I have found that, if the advance ratio is increased to values beyond 0.4, two bladed rotors are better to achieve invariant lift then three bladed ones.

In Figure 20 it will be observed that the sum of the lifts for the blades in the side positions is less than for the sum for blades in the front and back positions. If there were three blades with two on the advancing side and only one on the retreating side the total lift would be far greater than for the reverse positions. Also the departure from constant lift would be greater than the case of two blades with one each on laterally opposite sides of the axis of rotation. This is of course on the assumption that there is no means of bringing the lift of the retreating blade up to equality with the advancing blade which is always true for a large advance ratio.

It is thus clear that the rotor of two blades is more suited to achieving invariant total lift than three blades for a large advance ratio.

The constancy of lift can be achieved either by reducing the lift of the blades in the front and back positions, or increasing the lift of the blade in the advancing position. It is assumed the retreating blade will have as much lift as possible from various devices including a flap of the type of flap 140.

Increasing the lift of the advancing blade is contrary to present teaching since if the blades are hinged at the root the advancing blade will rise too high—or if it is fixed at the root the bending moment and hence the stresses will be too high. In both cases there will be upsetting moments; in the first case due to the horizontal component of the lift on the upwardly inclined blade and in the second case due to the offset of the lift from the axis.

In either of these cases the upsetting moment is cared for by the use of two side by side rotors whose upsetting forces will be equal and opposite. There will however remain the question of vibration due to the periodicity of the moments. This is taken care of as follows.

Figure 21:
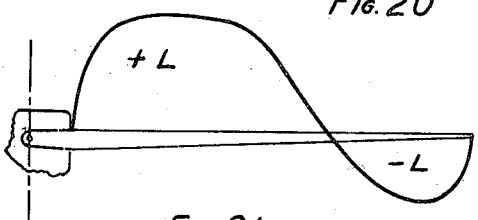
Figure 21 is a graph of the lift loading along the span of a blade.

The blade is arranged so that on the advancing side with the flap 146 down slightly the outer portions of the blade are carrying negative lift while the inner portions are carrying a large positive lift as indicated in Figure 21. The amount of negative lift is small in magnitude but because it has such a large arm with respect to the root of the blade it exerts a very large moment. In the case of the hinged blade this will keep the blade from rising unduly and in the case of the rigid blade it will reduce the root stresses.

It is thus clear from the foregoing remarks on two blades and on the axis attitude that two blades in a rotor cooperate with the attitude of the rotor axis to make feasible a balanced rotor at large advance ratios—balanced as to vertical and horizontal forces.

The large lift at the root arises from the large mean camber of the root section (which is a feature of this invention) and the high value of the combined translational and forward velocity. The negative lift at the tip is achieved by decreasing the pitch of the wing main body toward the tip and by twisting the flap to raise the trailing edge toward the tip of the wing as shown in Figure 22 which is a rear elevation of the wing. The trailing edge is shown by line 190.

The achievement of negative lift at the tip and positive lift at the inner portions and on the outer portions of the retreating blade is facilitated by the plan form of the blade and flap. It will be noted in Figure 15 that the flap chord at the tip bears a greater ratio to the corresponding blade chord than the flap chord at the root bears to its blade chord. Hence when the flap is raised there is a greater decrease in angle of attack at the tip than at the root. This will be clear from Figure 23 which shows the effect of displacing flaps of unequal chords by equal angles of rotation. It is clear that the relatively wider flap chord at the tip will cause the blade tip to reach a negative value while the root portion is still positive. See Figures 23 to 25. The difference in $\alpha_1$ and $\alpha_2$ of Figure 23 assures this. In addition there is the twist in the trailing edge already mentioned.

On the retreating side the larger relative chord at the tip overweights the twist in the flap and allows the retreating wing to achieve its full possible lift with the flap down and the jet flowing from the slot 62.

By keeping the advancing blade from flapping upward the horizontal component is reduced to a small amount from the point of vibrations. If further smoothness of action is desired the blade may be treated as described in my pending application Serial No. 494,916 filed July 16, 1943, now Patent No. 2,425,650, entitled Aircraft. It describes a means of moving the mass of the retreating blade radially to provide a centrifugal force to offset the residual horizontal component of the lift of the advancing blade.

The use of negative lift on the outboard portion of the blade is applicable to all rotors, singly or in combination.

The decrease of the lift of the blade in the front and back positions is accomplished by means of the control device 74 which has been described. The pressure responsive elements are arranged to change the cam contour in the front and back positions to reduce the lifts of the blades in these positions.

The mechanism for operating the tip flap has the same devices 173 and 180 for interrupting the automatic adjustment of the flap position and for restoring it to alignment with the main body of the blade. Then at still higher forward speeds the flap 146 on the outboard portion of the retreating blade can be brought to normal attitude in relation to the main body of the blade. The upright axis of rotation is then tilted rearward at the top giving the retreating blade a positive angle of attack with respect to the translational velocity vector. Then as the forward speed continues to increase the positive lift on the inner portion of the blade progresses toward the tip of the retreating blade reaching it when the advance ratio is one ($\lambda=1$). In this case it will be desirable to make the noses of the airfoil sections quite sharp, even more so than the sections of Figures 24 and 25.

I have now described suitable embodiments of my invention which are now preferred. It is to be understood however that the invention is not limited to the particular construction illustrated and described and that I intend to claim it broadly as indicated by the scope of the appended claims.

I claim:

1. In combination in an aircraft, a blade, means supporting the blade for rotation about an upright axis, means to rotate said blade about said axis to support the aircraft in translational motion with the axis of rotation substantially perpendicular to the said translational direction, propulsive means to propel the aircraft in translation, a trailing edge flap on said blade extending a distance inward from said blade tip less than the radius of said blade, means operable in relation to the orbital position of said blade to depress said flap on the blade in the retreating position to create a large lifting capacity on the outer portion, and means also operable in relation to the orbital position of said blade to increase the pitch angle of a substantial portion of said blade inboard of the inner end of said flap to establish a positive angle of attack relative to the reversed flow direction in the retreating position of said blade to produce a supporting lift from said reversed flow.

2. In combination in an aircraft of the direct lift type, a blade main body and a plurality of flaps to form a blade, means supporting said blade for rotation about an upright axis, one of said flaps being adjustably supported on said main body at the inner portion of said blade, another of said flaps being adjustably supported along the outer portion of said blade on the opposite side from the first said flap, and means responsive to the orbital position of said blade to adjust said flaps coincidentally downward in the retreating position of the blade.

3. In combination in an aircraft of the direct lift type, a blade main body and a plurality of flaps to form a blade, means supporting said blade for rotation about an upright axis, one of said flaps being adjustably supported on said main body at the inner portion of said blade, another of said flaps being adjustably supported along the outer portion of said blade on the opposite side from the first said flap, and means to adjust said flaps automatically in accordance with the orbital position of said blade.

4. In combination in an aircraft, a blade, means to support said blade for rotation about an upright axis, means to rotate said blade through advancing and retreating positions, means for selectively changing the lift of inboard and outboard portions of the blade, and means for controlling said lift changing means in relation to the orbital position of the blade to give the inboard portion of the blade a positive lift and the outboard portion a negative lift when the blade is in the advancing position.

5. In a direct lift aircraft of the side-by-side twin rotor type, a lifting rotor on each side of the longitudinal axis of the aircraft, means supporting each rotor for rotation about an upright axis, power means to rotate said rotors in opposite directions to sustain the aircraft, power operated means propelling the aircraft to attain a forward advance ratio greater than $\lambda=0.4$ whereby the retreating blade has a positive lift on the tip portion but less total lift than the average lift for all positions of the blade, and means operable in relation to the orbital position of the blades to deform the blades on the advancing sides to provide a positive lift for the inner portion and a negative lift for the tip portion of each blade, said side-by-side arrangement of oppositely rotating rotors providing for a balance between the horizontal components of the lift vectors on said advancing blades.

6. In combination in a direct lift aircraft, a blade, means supporting said blade for rotation about an upright axis, means to rotate said blade to sustain the aircraft, said blade having a lift varying means along one edge of the inboard portion thereof and another lift varying means along the opposite edge of the outboard portion of said blade, actuating means for operating said lift varying means in unison including pilot operated means to disconnect said actuating means and one of said lift varying means.

7. In combination in a direct lift aircraft, a blade, means supporting said blade for rotation about an upright axis into advancing and retreating positions, means to vary the lift created by said blade in different lengthwise portions thereof in relation to the orbital position of the blade, and means operable orbitally to control said lift varying means providing for developing a negative lift along an outer portion of each said blade and a positive lift along an inner portion thereof as said blade occupies the advancing position.

8. In combination in a direct lift aircraft, a blade, means for supporting said blade for rotation about an upright axis into advancing and retreating positions, said blade being adapted to develop a positive lift on its tip portion in the retreating position, and means to deform the trailing edge of the outer portion of the blade and the leading edge of the inner portion of the blade in relation to its orbital position to develop a negative lift along said outer portion and a positive lift along said inner portion when the blade is in the advancing position.

9. In combination in a direct lift aircraft, a rotor having two blades located opposite each other, means to support said blades for rotation about an upright axis, means for varying the lift of said blades in relation to their orbital position including outer and inner adjustable flaps on each said blade, the chord of said flaps increasing outwardly toward the tip thereof, and means for controlling said lift varying means to develop a negative tip load on the advancing blade tending to equalize the lifts on the two blades.

10. In combination in an aircraft of the direct lift type, a blade main body and a plurality of flaps to form a blade, means for controlling the boundary layer on the surface of said blade, means supporting said blade for rotation about an upright axis, one of said flaps being adjustably supported on said main body at the inner portion of said blade, another of said flaps being adjustably supported along the outer portion of said blade on the opposite side from the first said flap, and means to adjust said flaps automatically in accordance with the orbital position of said blade.

11. In combination in an aircraft, a blade, means for controlling the boundary layer on said blade, means to support said blade for rotation about an upright axis, means to rotate said blade through advancing and retreating positions, means for selectively changing the lift of inboard and outboard portions of the blade, and means for controlling said lift changing means in relation to the orbital position of the blade to give the inboard portion of the blade a positive lift and the outboard portion a negative lift when the blade is in the advancing position.

EDWARD A. STALKER.

REFERENCES CITED

The following references are of record in the file of this patent:

UNITED STATES PATENTS

| Number | Name | Date |
|---|---|---|
| Re. 22,595 | Upson | Jan. 23, 1945 |
| 1,892,036 | Campens | Dec. 27, 1932 |
| 1,982,968 | Stalker | Dec. 4, 1934 |
| 1,982,969 | Stalker | Dec. 4, 1934 |
| 2,256,918 | Young | Sept. 23, 1941 |
| 2,317,340 | Bennett | Apr. 27, 1943 |

FOREIGN PATENTS

| Number | Country | Date |
|---|---|---|
| 482,607 | Germany | Sept. 17, 1929 |
| 342,812 | Italy | Aug. 21, 1936 |
| 489,420 | Great Britain | July 25, 1938 |
| 826,798 | France | Jan. 12, 1938 |